(12) United States Patent
    Taylor

(10) Patent No.: US 12,611,975 B2
(45) Date of Patent: Apr. 28, 2026

(54) VEHICLE SEAT PROVIDED WITH A LATTICE BEARING STRUCTURE

(71) Applicant: FERRARI S.P.A., Modena (IT)

(72) Inventor: Daniel Martin Taylor, Modena (IT)

(73) Assignee: FERRARI S.P.A., Modena (IT)

( * ) Notice: Subject to any disclaimer, the term of this patent is extended or adjusted under 35 U.S.C. 154(b) by 171 days.

(21) Appl. No.: 18/585,808

(22) Filed: Feb. 23, 2024

(65) Prior Publication Data

US 2024/0294101 A1     Sep. 5, 2024

(30) Foreign Application Priority Data

Mar. 2, 2023     (IT) ........................ 102023000003768

(51) Int. Cl.
    *B60N 2/70*          (2006.01)
(52) U.S. Cl.
    CPC ......... *B60N 2/7094* (2013.01); *B60N 2/7017* (2013.01)
(58) Field of Classification Search
    None
    See application file for complete search history.

(56) References Cited

U.S. PATENT DOCUMENTS

| | | | | |
|---|---|---|---|---|
| 10,750,820 | B2 * | 8/2020 | Guyan ................... | A43B 13/16 |
| 11,745,878 | B2 * | 9/2023 | Hallford .............. | B60N 2/7017 |
| | | | | 297/216.12 |
| 11,835,103 | B2 * | 12/2023 | Achten ................... | F16F 1/328 |
| 2019/0016243 | A1 * | 1/2019 | Pancol ................... | B60N 2/60 |
| 2020/0331176 | A1 | 10/2020 | Yokota | |
| 2021/0069948 | A1 | 3/2021 | Selvasekar et al. | |
| 2021/0259425 | A1 * | 8/2021 | Michalak ............... | A47C 7/282 |

FOREIGN PATENT DOCUMENTS

| | | | | |
|---|---|---|---|---|
| JP | 2005212204 | A | * | 8/2005 |
| WO | 20200016442 | A1 | | 1/2020 |

OTHER PUBLICATIONS

Italian Search Report for Application No. 202300003768; Filing Date: Mar. 3, 2023; Date of Mailing: Aug. 29, 2023; 7 pages.

* cited by examiner

*Primary Examiner* — Richard Green
(74) *Attorney, Agent, or Firm* — CANTOR COLBURN LLP

(57)          ABSTRACT

A seat for a vehicle and having: a bearing structure, which is elastically yielding and has at least one component provided with a lattice body manufactured by means of additional manufacturing involving powder bed fusion; a cover, which covers the lattice body and makes up the aesthetic and tactile interface to the outside; and a closed bag, which contains, on the inside, the lattice body and is arranged more on the inner side of the cover and, hence, is arranged between the cover and the lattice body.

17 Claims, 1 Drawing Sheet

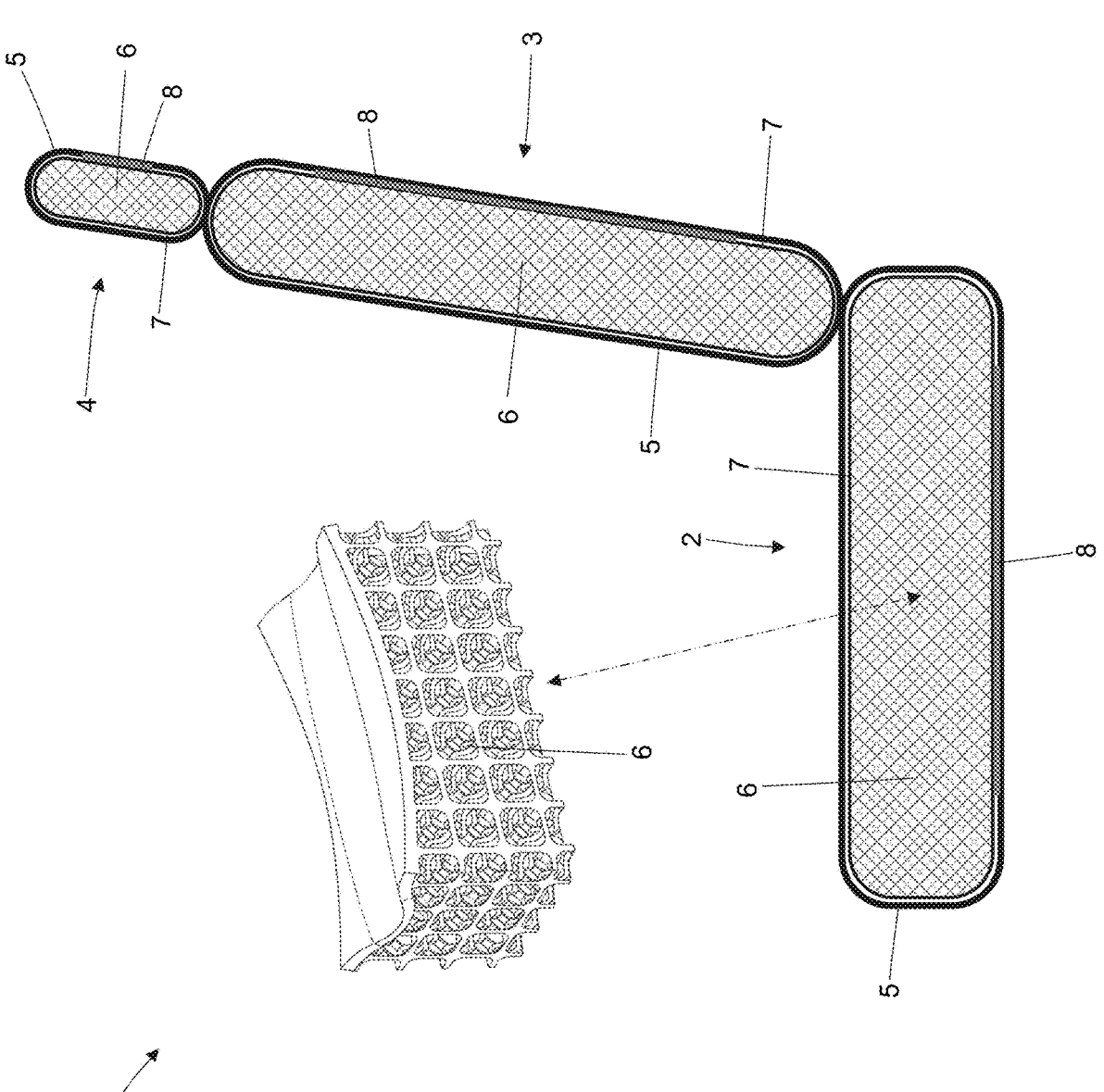

VEHICLE SEAT PROVIDED WITH A LATTICE BEARING STRUCTURE

CROSS-REFERENCE TO RELATED APPLICATIONS

This patent application claims priority from Italian patent application no. 102023000003768 filed on Mar. 2, 2023, the entire disclosure of which is incorporated herein by reference.

TECHNICAL FIELD

The invention relates to a vehicle seat provided with a lattice bearing structure.

PRIOR ART

The seat of a vehicle consists of a seat cushion having a substantially horizontal arrangement and of a backrest having a substantially vertical arrangement.

From a constructive point of view, the seat of a vehicle comprises a frame (typically made of metal or composite material), which is fixed to the floorboard of the vehicle, a bearing structure, which is mounted on the frame and is elastically yielding, and a cover, which covers the bearing structure and makes up the aesthetic and tactile interface to the outside (the cover can be made of fabric or leather).

A suggestion was recently made about manufacturing the bearing structure of a seat with a three-dimensional lattice design by means of a 3D-printer (namely, through additive manufacturing).

For the construction of a lattice bearing structure of a seat (which inevitably has relatively large dimensions) the additive manufacturing technology that has proved to be most suited for the purpose is powder bed fusion, which can be carried out as selective laser sintering ("SLS") or as multi jet fusion ("MJF"): in both cases, a source of heat (high-power laser in "SLS", infrared in "MJF") is used to sinter small particles of polymer powder and turn them into a solid structure based on a three-dimensional model; as a matter of fact, since the non-fused powder supports the part during the printing process, no support structures are needed and this makes powder bed fusion ideal for complex geometries, among which there are inner details, undercuts, thin walls and details in negative.

At the end of the production of a lattice bearing structure of a seat through power bed fusion, the lattice bearing structure has to be cleaned by removing excess powder (which can be recycled and reused); however, while removing the large quantity of powder located around and inside the lattice bearing structure is simple and quick, removing the residual powder attached to be lattice bearing structure is much more complicated and time-consuming. Indeed, for a complete removal (cleaning) of the powder that sticks to the lattice bearing structure, expensive and complicated methods have to be used (such as, for example, solvent baths), especially when the lattice bearing structure has a thickness of more than 50 mm. However, all the residual powder attached to the lattice bearing structure needs to be anyway removed from the lattice bearing structure of a seat, for, in use and over time, a significant part of said residual powder detaches from the lattice bearing structure (also due to the continuous deformations to which the lattice bearing structure is subjected during its us) and spreads in the passenger compartment, thus dirtying it to an unacceptable extent. Hence, the final removal operations to be carried out to remove the residual powder that sticks to the lattice bearing structure involve a significant increase in seat manufacturing costs and times.

The patent application US2021069948A1 describes a vehicle seat in which a central part comprises two lattice structures made using additive manufacturing and with different densities.

The patent application WO2020016442A1 describes a support component for the body of a passenger in a vehicle provided with a three-dimensional lattice structure made using additive manufacturing.

DESCRIPTION OF THE INVENTION

The object of the invention is to provide a vehicle seat provided with a lattice bearing structure, which reduces manufacturing costs and times.

According to the invention, there is provided a vehicle seat provided with a lattice bearing structure as claimed in the appended claims.

The appended claims describe preferred embodiments of the invention and form an integral part of the description.

BRIEF DESCRIPTION OF THE DRAWINGS

The invention will now be described with reference to the accompanying drawing, which shows a non-limiting embodiment thereof; in particular the accompanying FIGURE is a schematic view of a seat, which is provided with a lattice bearing structure and is manufactured according to the invention.

PREFERRED EMBODIMENTS OF THE INVENTION

In the accompanying FIGURE, number 1 indicates, as a whole, a seat for a vehicle designed to accommodate a corresponding passenger.

The seat 1 comprises a bearing structure (namely, designed to carry the corresponding passenger), which is elastically yielding and is divided into three components: a seat cushion 2 having a substantially horizontal arrangement, a backrest 3 having a substantially vertical arrangement (the cushion 2 and the backrest 3, together, give the seat 1 an "L" shape) and a headrest 4, which is arranged above the backrest 3 and can be integrated with the backrest 3 (namely, can form one single indivisible body with the backrest 3).

The seat 1 comprises a frame (typically made of metal or composite material), which is fixed to a floorboard of the vehicle and on which the bearing structure consisting of the cushion 2, of the backrest 3 and of the headrest 4 is fixed. Each component (cushion 2, backrest 3, head rest 4) of the bearing structure is covered by a cover 5, which makes up the aesthetic and tactile interface to the outside (the cover 5 can be made of fabric or leather).

The bearing structure of the seat 1 is lattice, namely each component (cushion 2, backrest 3, headrest 4) of the bearing structure comprises a lattice body 6, which is manufactured with TPU ("ThermoPlastic Polyurethane") by means of a powder bed fusion (for example, using a multi jet fusion process), has a lattice conformation and is manufactured with 3D-printers (namely, by means of additive manufacturing). Each lattice body 6 is built by interlocking uprights according to suitable geometric schemes, mainly of the pyramid-like type. In other words, each lattice body 6 consists of fused powder and is made using additive manufacturing that involves powder bed fusion.

Each lattice body 6 is inserted (encapsulated) inside a respective bag 7, which is tightly sealed (typically, by means of ultrasound sealing). Namely, each bag 7 has, at first, an open side through which the respective lattice body 6 is inserted; subsequently, the open side of each pocket 7 is tightly sealed in order to completely encapsulate the lattice body 6.

Each bag 7 is arranged on the inner side of the cover 5 and, therefore, is arranged between the cover 5 and the corresponding lattice body 6; hence, each bag 7 is completely hidden for it is covered by the cover 5 and is a sort of "skin" surrounding the corresponding lattice body 6 under the cover 5.

Each bag 7 is made of a material that is permeable to air and impermeable to the powder making up the respective lattice body 6, so that the bag 7 allows the lattice body 6 to "breathe" (namely, to release air to the outside when it is compressed and to take air from the outside when it expands), but does not allow the powder that might detach, in use, from the lattice body 6 to get out. The fact that the bag 7 is made of an air-permeable material is highly important in order to allow the bag 7 to accompany, without interferences and without breaking, the elastic deformations to which the lattice body 6 inserted inside the bag 7 is subjected in use.

In other words, each bag 7 contains the corresponding lattice body 6 inside, is closed on all sides to define a sealed, powder-tight chamber to prevent the powder, which the lattice body 6 is made of, escaping through the bag, and is arranged on the inner side the cover 5 and, thus, is located between the cover 5 and the lattice body 6.

According to a preferred embodiment, each bag 7 is made of nonwoven fabric having meshes with a dimension smaller than 5-10 μm (preferably 7 μm).

According to a possible embodiment, each bag 7 is fixed (glued) to the respective lattice body 6 by means of adhesive 8, which is preferably arranged on the back of the lattice body 6 (namely, on the opposite side relative to the support surface on which the passenger lies).

In the embodiment shown herein, all components (cushion 2, backrest 3, headrest 4) of the bearing structure are lattice and, hence, comprise respective lattice bodies 6 inserted in bags 7. According to other embodiments which are not shown herein, only one component or only two components (cushion 2, backrest 3, headrest 4) of the bearing structure are lattice and, hence, comprise respective lattice bodies 6 inserted in bags 7. According to other embodiments which are not shown herein, all components (cushion 2, backrest 3, headrest 4) of the bearing structure are lattice and, hence, comprise respective lattice bodies 6, but not all lattice bodies 6 are inserted in bags 7 as at least one lattice body 6 is previously subjected to an accurate cleaning for the removal of all residual powder at the end of the production process through additive manufacturing.

The embodiments described herein can be combined with one another, without for this reason going beyond the scope of protection of the invention.

The seat 1 described above can advantageously be used in any type of road vehicle (for example, a car or a motorcycle) and also in any type of non-road vehicle.

The seat 1 described above has numerous advantages.

First of all, during the manufacturing of the lattice bodies 6 of the components (seat 2, backrest 3, headrest 4) of the bearing structure there is no need for an accurate and complete removal of the residual powder left on the lattice bodies 6 at the end of the production process by means of additive manufacturing, since the residual powder, which, in use, can detaches from the lattice bodies 6, remains inside the bags 7 and, hence, cannot dirty the passenger compartment in any way. By avoiding the accurate and complete removal of the residual powder left on the lattice bodies 6, the duration and the costs of the production of the lattice bodies 6 are significantly reduced.

It should be pointed out that the production cost of the bag 7 is very small, since the production of the bag 7 requires a small amount of nonwoven fabric (in the range of a few dozen grams for each component of the bearing structure), which can easily be found in the market at low prices; furthermore, said nonwoven fabric can easily be sealed through ultrasounds in order to allow the nonwoven fabric to gain the desired bag shape.

It should also be pointed out that the additional space taken up by the presence of the bag 7 is insignificant as the bag 7 has a thickness of less than 1-2 mm and that the additional weight determined by the presence of the bag 7 is extremely small as it is in the range of a few dozen grams for each component of the bearing structure.

LIST OF THE REFERENCE NUMBERS OF THE FIGURES

1 seat
2 cushion
3 backrest
4 headrest
5 cover
6 lattice body
7 bag
8 adhesive

The invention claimed is:

1. A seat (1) for a vehicle and comprising:
a bearing structure, which is elastically yielding and has at least one component provided with a lattice body (6);
a cover (5), which covers the lattice body (6) and makes up the aesthetic and tactile interface to the outside; and
a bag (7), which contains, on the inside, the lattice body (6), is closed on all sides to define a sealed, powder-tight chamber to prevent the powder, which the lattice body (6) is made of, escaping through the bag, and is arranged on the inner side of the cover (5) and, hence, is arranged between the cover (5) and the lattice body (6);
wherein the lattice body (6) consists of fused powder and is made using additive manufacturing involving powder bed fusion;
wherein the cover (5) is made of fabric or leather.

2. The seat (1) according to claim 1, wherein the bag (7) is tightly sealed.

3. The seat (1) according to claim 1, wherein the bag (7) is made of a material that is permeable to air.

4. The seat (1) according to claim 1, wherein the bag (7) is made of a material that is impermeable to the powder making up the lattice body (6).

5. The seat (1) according to claim 1, wherein the bag (7) is made of nonwoven fabric.

6. The seat (1) according to claim 1, wherein the bag (7) is made of a material having meshes with a dimension that is smaller than 5 μm.

7. The seat (1) according to claim 1, wherein the bag (7) is fixed to the lattice body (6).

8. The seat (1) according to claim 7, wherein the bag (7) is glued to the lattice body (6) by means of adhesive (8).

9. The seat (1) according to claim 7, wherein the bag (7) is fixed to a rear area of the lattice body (6).

10. The seat (1) according to claim 1, wherein the component of the bearing structure is a seat cushion (2), a backrest (3) or a headrest (4).

11. The seat (1) according to claim 1, wherein the bearing structure comprises multiple components, each of which is provided with a corresponding lattice body (6) inserted in a corresponding bag (7) and covered by a corresponding cover (5).

12. The seat (1) according to claim 11, wherein the components of the bearing structure are a cushion (2), a backrest (3), and a head rest (4).

13. A method for producing a seat (1) for a vehicle and comprising the steps of:

manufacturing a lattice body (6) of a component of an elastically yielding bearing structure of the seat (1) using additive manufacturing that involves powder bed fusion so that the lattice body (6) consists of fused powder;

covering the lattice body (6) with a cover (5) that is made of fabric or leather and constitutes the aesthetic and tactile interface with the outside;

manufacturing a bag (7) that defines a powder-tight chamber for preventing the powder, which the lattice body (6) is made of, from escaping the bag;

arranging the lattice body (6), before being covered by the cover (5), inside the bag (7); closing the bag (7) around the lattice body (6) so that the bag (7), closed on all sides, defines a sealed, powder-tight chamber to prevent the powder, which the lattice body (6) is made of, from escaping through the bag; and covering the lattice body (6) with the cover (5) so that the bag (7) is arranged on the inner side of the cover (5) and, thus, is located between the cover (5) and the lattice body (6).

14. The production method according to claim 13, wherein the bag (7) is made of a material that is permeable to air and impermeable to the powder making up the lattice body (6).

15. The production method according to claim 13, wherein the bag (7) is made of nonwoven fabric having meshes with a dimension that is smaller than 5 $\mu$m.

16. The production method according to claim 13, wherein the bag (7) is made of a material that is permeable to air.

17. The production method according to claim 13, wherein the bag (7) is fixed to the lattice body (6).

\* \* \* \* \*